Oct. 10, 1944.   W. MELAS   2,359,927
LIQUID METER
Filed Jan. 22, 1943

INVENTOR.
William Melas
BY C. L. Ehret
ATTORNEY.

Patented Oct. 10, 1944

2,359,927

UNITED STATES PATENT OFFICE 2,359,927

LIQUID METER

William Melas, Philadelphia, Pa., assignor to Cochrane Corporation, Philadelphia, Pa., a corporation of Pennsylvania Application January 22, 1943, Serial No. 473,262

4 Claims. (Cl. 73—229)

My invention relates to measuring systems of the type in which a core or armature is moved in response to changes in magnitude of a condition under measurement to vary the ratio of inductances in different branches of a balanceable electrical network; it more particularly concerns adaptation of such apparatus for measurement of low rates of flow of fluids.

In accordance with my invention, the core or armature is mechanically connected to, preferably carried by or mounted upon, a float which is disposed in a rotating body of liquid or vortex to effect adjustment of the core in response to changes in level of the vortex and so provide that the position of the core shall vary as a function of the angular velocity of the liquid—itself variable in accordance with change in magnitude of a condition under measurement.

My invention further resides in systems and apparatus having the features of combination, construction and arrangement hereinafter described and claimed.

Figure 1:
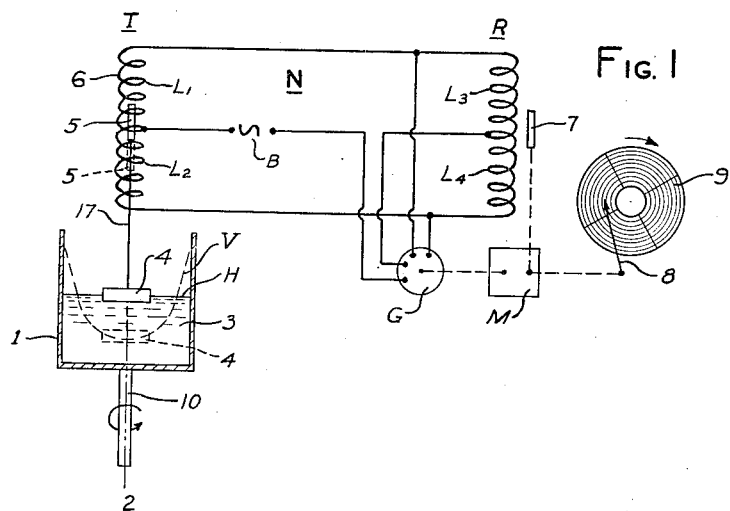
Figure 2:
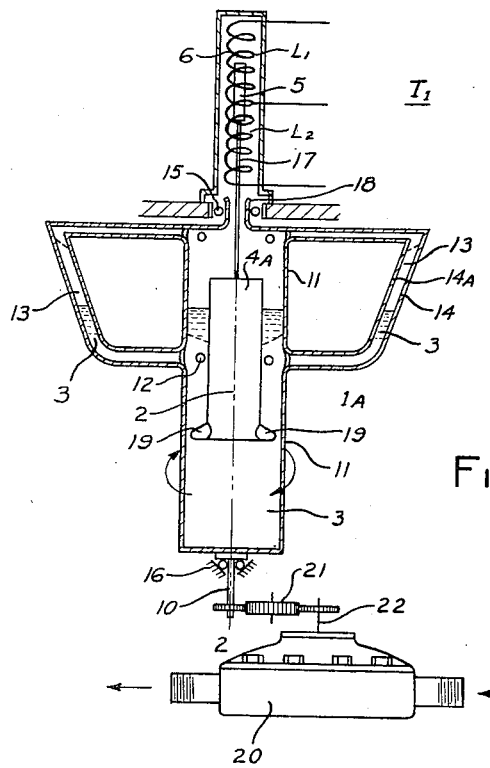

For an understanding of my invention reference is made to the accompanying drawing, in which:

Fig. 1 schematically illustrates a recorder system utilizing the invention;

Fig. 2 illustrates significant features of construction of elements of a modified form of the core-positioning device included in the system of Fig. 1.

Referring to Fig. 1, within the cup or container 1, suitably supported for rotation about axis 2, is disposed a body of liquid 3 which supports an assembly comprising float 4 and the core or armature member 5.

The position of core 5 within solenoid 6, which is disposed with its longitudinal axis in alignment with the axis of rotation 2 of cup 1, determines the magnitudes of inductance of coils L1, L2, of the transmitter T of the network, and therefore the ratio of the impedances of adjacent branches of the balanceable network or bridge N, provided with source B of alternating current. In the receiver R two other arms or branches of the bridge network N are respectively included the coils L3, L4, the ratio of whose impedances is determined by position with respect thereto of the movable core or armature 7.

For simplicity of explanation, it is assumed that when the cores 5 and 7 are symmetrically disposed with respect to the coils L1, L2 and coils L3, L4, the network N is balanced and the indicator or pen 8 is at the zero graduation or limit of the chart or scale 9. Under this circumstance, the quantity of liquid within the container 1 is selected to be such that with the cup 1 at rest, the core 5 is positioned substantially midway of the ends of solenoid 6 to procure 1 to 1 ratio of inductance of coils L1 and L2.

With the cup 1 at rest, the surface of the liquid 3 forms a horizontal plane H normal to the axis of rotation 2 of the cup, but when the cup 1 is rotated the surface of the liquid changes from a horizontal plane to a vortex or paraboloid of revolution symmetrical about the axis of rotation 2. In consequence the level of the liquid at the center of the cup, apex of the vortex, falls to extent dependent upon the angular velocity of the liquid, and core 5 correspondingly moves downwardly differentially to change the magnitudes of inductance of the coils L1, L2.

The galvanometer G, or equivalent device, in response to the unbalance of the network resulting from this change in inductance ratio of the bridge arms L1, L2 effects, preferably through a suitable relay mechanism M, movement of core 7 differentially to change the inductance ratio of the coils L3, L4 in sense and to extent required to restore balance of network N at the new position of core 5.

Concurrently with this adjustment of core 7 the pointer or recorder pen 8 is moved with respect to the chart or scale 9; alternatively or in addition, a control member such as a valve, rheostat, or the like may be adjusted to corresponding extent.

The receiver R of the system, comprising the galvanometer, mechanical relay and coils L3, L4 may for example be of the type disclosed in my Letters Patent 2,081,364 issued May 25, 1937, to which reference is made for more complete description of the details of construction.

For each speed of rotation of the cup, the shape of the vortex or the change in liquid level in cup 1 is definite and reproducible. The change in level of the surface of the liquid at any distance from the axis of rotation may be expressed by the formula:

$$Y = \frac{W^2 X^2}{2G}$$

where $X=$ is aforesaid distance from the axis of rotation $Y=$ change in level of the surface of the liquid $W=$ angular velocity in radians $G=$ gravitational force (acceleration of gravity)

The measuring system as thus far described may be utilized to measure the changes in magnitude of any condition which may be expressed in terms of angular velocity; for example, the shaft 10 of cup 1 may be connected to the vanes of an anemometer for measurement of wind velocity, or it may be connected to the rotating element of any suitable motor, such as a turbine, or of any suitable positive displacement type of motor, such as a positive displacement flow-meter, including the "wobble disc" type, and others.

The parameters of the generatrix of the vortex surface do not depend upon the character of the liquid comprising body 3, and consequently the liquid may be selected in any particular installation to afford desired speed of response to changes in magnitude of the measured condition, and the usual desired damping characteristic.

The inertia of the centrifugal device may be reduced with consequent increase in speed of response by utilizing a liquid having relatively low specific gravity; a suitable light mixture resistant to evaporation losses comprises glycerine, water and "Prestone" (the well known anti-freeze composition) having the proportions of weight of about 10% Prestone, 40% glycerine, and 50% water.

Further to increase the speed of response without adverse effect upon the range of measurement, which latter may be as great as ten to one without loss of accuracy or reproducibility, recourse may be had to the modification shown in Fig. 2 in which the volume of liquid is reduced by utilizing a modified form of vortex cup 1A having a central elongated tubular portion 11 of small diameter in which the main body of the liquid is disposed and which communicates, as by series of openings 12, with the relatively narrow annular chamber 13 of relatively large diameter and defined by the space between the preferably steep walls of cups 14, 14A having the common axis of rotation 2.

By way of example, for procuring extent of movement of core 5 of about one inch corresponding with 99 to 100 revolutions per minute of cup 1A, the length and diameter of chamber 11 are respectively about 6" and 2½", the width of chamber 13 is about ¼ inch and the radius of chamber 13 is about 3 inches. Such apparatus in practice has shown extraordinary sensitivity of the measuring system; for example, with a float of diameter less than 2 inches, the measuring system detects and responds to a movement of core 5 of only .002 of an inch, and detects and responds to a force as minute as .001 gram exerted on the float.

The chamber 13 is preferably substantially entirely closed or isolated from the ambient atmosphere to avoid evaporation losses which would cause change in calibration or shift of the zero of the transmitter T comprising the float assembly 4A, 5, solenoid 6 and cup assembly 1A. The only path afforded for escape by evaporization is the relatively small gap between the rod 17, which supports the core 5 on float 4A, and the neck 18 of the cup assembly 1A; the cup 1 of Fig. 1 may similarly be provided with a cover to minimize evaporization losses.

When necessary to ensure axial alignment of the solenoid 6 with the float assembly, and to avoid errors otherwise arising from the tendency of the float assembly to stick to the side walls of the tube 11 with consequent sluggishness of response, the float 4A may be provided with a series of small projections or knobs or buffers 19 terminating short of contact with tube 11. To minimize or eliminate errors due to friction, the cup assembly is supported by ball-bearings 15, 16, or equivalent, and insofar as possible the float and core assembly is free of engagement with any structure, stationary or movable, other than the liquid 3, and in consequence the assembly moves in its path coincident with the axis of rotation of the liquid without development of friction detractive from the high sensitivity of the system afforded by correlation of the core with a vortex-float.

In the particular transmitter T1 of Fig. 2, the shaft 10 is driven from the rotatable element of flow-meter 20 of any suitable positive displacement type. When necessary, a gear train 21 may be interposed between the shaft 10 of cup 1A and shaft 22 of the flow-meter to effect the desired step-up, or step-down, ratio between the speeds of these two shafts; the "flow-meter" structure 20 serves as a motor, rather than a meter, operating at a speed representative of the rate of flow of the fluid driving it, and rotating the cup at a speed representative of the rate of flow of that fluid, with eventual evaluation, at receiver R, of that rate of flow.

The arrangement has proved to be particularly suited for accurate measurement of low rates of flow of liquid, for example 2 to 20 gallons per minute, without undue drop of pressure in the meter 20 or undue increase of load upon the pump or equivalent device which feeds the liquid, for example fuel oil, through meter 20 to its point of utilization, such as a furnace, or to storage.

My invention accordingly is characterized by vortical control of a balanceable inductive network, yielding a system of high sensitivity and accuracy; and is further characterized by special utility in the measurement of rates of flow of fluids, and the more especially when they are viscous or heavy, as exemplified by aforesaid fuel oil, in which case a manometer, as disclosed in aforesaid Melas patent, is unsuitable, and too insensitive at least for highly accurate measurement of low rates of flow, particularly when of the order aforesaid.

What I claim is:

1. A system for measuring rate of flow of liquid comprising a positive displacement motor having an element rotating at angular velocity representative of aforesaid rate of flow, a rotatable container driven by said rotating element and enclosing a body of rotating liquid, a solenoid having its axis in alignment with the axis of rotation of said container, an assembly, supported by said body of liquid, comprising a core movable axially of said solenoid and a float connected to said core and movable axially of said container in response to change of level of liquid in said container, a network in which said solenoid is included and whose balance is affected by movement of said core, and means controlled by said network for evaluating the magnitudes of said rate of flow.

2. A system for measuring the rates of flow of liquids comprising pairs of transmitter and receiver inductances forming a bridge, transmitter and receiver cores coacting respectively with said pairs of inductances to unbalance and rebalance the bridge, a galvanometer responsive to unbalance of the bridge, a mechanical relay controlled by the galvanometer and controlling actuation of the receiver core to rebalance the bridge, means for actuating the transmitter core comprising a body of liquid, means for rotating the liquid at speeds, representative of the rates of flow of a liquid throughout a range thereof of about ten to one, to produce a vortex, a float on the vortex, and means connecting the float directly to the transmitter core to effect movements thereof for said range of rates of flow with respect to the transmitter inductances equal to the movements of the float caused by the vortex, and means controlled by said relay for evaluating the magnitudes of the rates of flow.

3. A system for measuring the rate of flow of a viscous liquid comprising a balanceable network, inductances therein, a core movable with respect thereto to unbalance the network, means responsive to unbalance of the network for evaluating the rates of flow, and means for actuating the core comprising a body of liquid, means for rotating said body at speeds, representative of the rates of flow of said viscous liquid, to produce a vortex, a float on the vortex, and means uniting the float and core to effect movements of the core with respect to the inductances equal to the movements of the float.

4. A system for measuring low rates of flow of a liquid comprising a balanceable network, inductances therein, a core movable with respect thereto to unbalance the network, means in response to unbalance of the network evaluating the rates of flow of said liquid, and means for actuating the core comprising a body of liquid, means for rotating said body at speeds, representative of rates of flow of said first-named liquid within a range from about 20 to about 2 gallons per minute, to produce a vortex, a float on the vortex, and means connecting the float and core to effect movement thereof with respect to the inductances.

WILLIAM MELAS.